Patented June 25, 1946

2,402,685

UNITED STATES PATENT OFFICE 2,402,685

CHEMICAL PROCESSES

Frank Kerr Signaigo, Wilmington, Del., assignor to E. I. du Pont de Nemours & Company, Wilmington, Del., a corporation of Delaware No Drawing. Application April 13, 1940, Serial No. 329,581

13 Claims. (Cl. 260—608)

This invention relates to a chemical process and, more particularly, to a process for the preparation of aryl sulfides by reacting sulfur halides with aromatic hydrocarbons in the presence of catalysts.

It is known that benzene and toluene can be reacted with sulfur chloride in the presence of large amounts of aluminum chloride and that the products of the reaction are principally aryl monosulfides or thianthrene derivatives. At the most, only small quantities of di- or polysulfides are obtained. It is also known that the reaction of aromatic hydrocarbons with sulfur monochloride is catalyzed by the presence of small amounts of aluminum-mercury couple and that the products of these reactions are thianthrene derivatives obtainable only in poor yields. The reaction of aromatic hydrocarbons with sulfur chloride in the absence of catalysts yields chloro derivatives.

According to "Beilstein's Handbuch der Organische Chemie" IV edition, vol. VI, the principal method for obtaining aryl disulfides is by oxidation of the corresponding thiophenols by means of such reagents as oxygen, hydrogen peroxide, nitric acid, iodine, bromine, sulfur, etc. Methods listed for obtaining diphenyl disulfide include heating diphenyl monosulfide with sulfur, partial reduction of benzenesulfonyl chloride with hydriodic acid, and reaction of phenyl magnesium bromide with sulfur. Diphenyl tri- and tetrasulfides are formed by reaction of thiophenol with sulfur di- and monochloride.

This invention has as an object the preparation of aryl sulfides. A further object is the preparation of aryl sulfide compositions containing substantial proportions of sulfides having the general formula Ar—$S_n$—Ar, where Ar represents an aromatic nucleus and $n$ is an integer greater than 1. A still further object is the preparation of aryl di- and polysulfides by a very economical method. Other objects will be apparent from a reading of the following description of the invention.

These objects are accomplished by reacting an aromatic hydrocarbon with a sulfur halide in the presence of a limited amount of a sulfurization catalyst. By a limited amount is meant an amount of catalyst not exceeding 10% and preferably not more than 5% of the weight of the reactants.

It has been found that certain metal halides or other materials which are described later catalyze the reaction of aromatic hydrocarbons with a sulfur chloride at moderate temperatures with the formation of aromatic sulfides and the substantially complete elimination of chlorine as hydrogen chloride. Moreover, when sulfur monochloride is reacted with aromatic hydrocarbons in the presence of small amounts of these sulfurization catalysts, the products, consisting of mixtures of aryl sulfides, contain a substantial proportion of di- and polysulfides.

In practicing this invention usually an excess of aromatic hydrocarbon, which may be dissolved in an inert solvent, is heated at about 100° C. with 1 to 3% by weight of the catalyst while sulfur monochloride is added. The evolution of hydrogen chloride commences soon after the addition of sulfur chloride is started, and the reaction is complete when no more hydrogen chloride is evolved. The last traces of dissolved hydrogen chloride are removed by blowing nitrogen through the reaction mixture and the solvent or excess hydrocarbon used is then separated from the product by distillation. The amount of aryl di- or polysulfides in the product may be determined conveniently by reducing the mixture with hydrogen at 150° C. and superatmospheric pressure, using a precipitated cobalt polysulfide catalyst. Under these conditions di- and polysulfides are converted to the corresponding thiophenols while monosulfides and sulfides of the thianthrene type remain unchanged. The amount of thiols formed, which may be determined readily by titration with standard iodine, serves as a measure of the di- and polysulfides in the original sulfide mixture.

The following examples show in detail the methods of practicing this invention. The amounts of materials referred to are given as parts by weight unless otherwise indicated.

Example I

Naphthyl sulfides were prepared according to this invention by the following procedure.

One thousand parts of commercial naphthalene was placed in a reactor fitted with a stirring device. The reactor and contents were then heated with steam to 100° C. and after the naphthalene was melted, 10 parts of granulated anhydrous zinc chloride was added. When the temperature had reached 100° C., 340 parts of commercial sulfur monochloride was run into the stirred naphthalene during a period of one-half hour. Vigorous evolution of hydrogen chloride commenced as soon as the addition of sulfur chloride was started, and ceased about five minutes after all of the sulfur chloride had been added. The hydrogen chloride evolved was collected in water and the last traces of this gas, which remained dissolved in the reaction mixture, were removed by blowing nitrogen through the molten mixture. The total hydrogen chloride collected was determined by titration to be 98% of the theoretical amount. The mixture was then heated at a pressure of 25 mm. and the unreacted naphthalene distilled out. The amount of naphthalene thus recovered was 574 parts. The residue (460 parts) was a brown resin which softened at 100° C. Analysis showed the product to contain 28% of sulfur and 0.12% of chlorine. The amount of naphthyl di- and polysulfide present in the mixture was determined as follows:

A sample of the resinous naphthyl sulfides was dissolved in benzene and hydrogenated at 150° C. at a hydrogen pressure of 1500 lbs./sq. in. using a precipitated cobalt polysulfide catalyst. After the hydrogenation was complete, the solution was filtered from the catalyst and boiled to remove any hydrogen sulfide formed. Titration of this mixture with standard iodine indicated that 0.37 mole of thiols was formed from each 100 grams of original reaction product. Calculation indicated that approximately 60% of the original sulfide mixture consisted of naphthyl di- or polysulfides. These transformations are illustrated by the following equations:

(1) 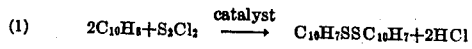

(2) 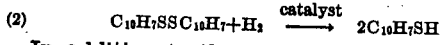

In addition to the disulfide formed as shown by Equation 1, there were also formed other naphthyl sulfides. Possible structures for these latter are: $C_{10}H_7$—S—$C_{10}H_7$

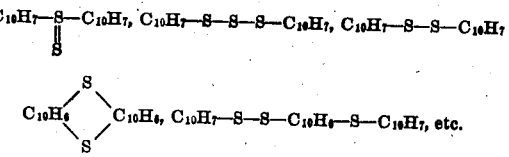

Example II

A mixture of phenyl sulfides was obtained by the following procedure.

Four hundred parts of ordinary benzene was stirred under reflux with 2 parts of ferric chloride while 68 parts of sulfur monochloride was added during one-half hour. The evolution of hydrogen chloride continued while the mixture was stirred and refluxed for 12 hours, after which time the evolution of hydrogen chloride ceased. Removal of the excess benzene by distillation left a residue of 75 parts of phenyl sulfides. This semi-solid product contained a substantial proportion of phenyl di- and polysulfides as shown by the fact that hydrogenation of the mixture using a cobalt sulfide catalyst under conditions described in Example I yielded 34 parts of thiophenols, from which pure thiophenol was obtained by vacuum distillation.

The process of this invention yields phenyl sulfides having a substantial proportion of di- and polysulfides in contrast to work described in the literature, wherein relatively large amounts of aluminum chloride catalyst are used to effect the reaction between benzene and sulfur monochloride. This is shown by comparison of the above results with those of the following experiment.

Four hundred parts of benzene was stirred with 68 parts of aluminum chloride while 68 parts of sulfur monochloride was added during 1 hour. Vigorous evolution of hydrogen chloride occurred and after this had ceased, the mixture was allowed to stand for 12 hours and then poured onto ice to decompose the aluminum chloride complex. Distillation of the benzene from the washed and dried oil layer yielded a semi-solid mixture of phenyl sulfides. When the latter was hydrogenated to convert the di- and polysulfides to the corresponding thiophenols the yield was only 7.7 parts of thiophenols, showing that only a small amount of phenyl di- and polysulfides were present in the original product.

Example III

Four hundred parts of commercial xylene was stirred and heated at 100° C. with 5 parts of anhydrous zinc chloride while 68 parts of sulfur monochloride was added during one hour. Hydrogen chloride evolution was vigorous and ceased soon after the addition of the last of the sulfur chlorides. The amount of hydrogen chloride evolved, as determined by collecting the gas in water and titrating an aliquot with alkali, was 93% of the theoretical amount. The solution of xylyl sulfides in the excess xylene was decanted from the zinc chloride catalyst, and the xylene was removed by distillation. Two hundred ninety-five parts of xylene were recovered, leaving a residue consisting of 130 parts of a liquid mixture of xylene sulfides containing 24% of sulfur. Hydrogenation of this product yielded an oil containing 73 parts of thioxylenols. Calculation indicated that the yield of xylene di- and polysulfides was 53% of the theoretical, based on the xylene reacting or the sulfur chloride used.

Example IV

Four hundred parts of toluene was stirred and heated to 100° C. with 3 parts of anhydrous ferric chloride. Sixty-eight parts of sulfur monochloride was added during 45 minutes. The evolution of hydrogen chloride continued for 1 hour after addition of the last of the sulfur chloride. The total hydrogen chloride collected was 94% of the theoretical amount. Distillation of the excess toluene yielded as a residue 94 parts of a viscous liquid mixture of tolyl sulfides containing 33.8% of sulfur. This product contained 39 parts of di- and polysulfides, determined as in the preceding examples.

Example V

Four hundred sixty-two parts of biphenyl and 5 parts of zinc chloride were heated at 100° C. with stirring, while 68 parts of sulfur monochloride was added continuously during 1.5 hours. Evolution of hydrogen chloride was vigorous during the addition of sulfur monochloride and the amount evolved was nearly that theoretically expected. The excess biphenyl (317 parts) was then removed by distillation at a pressure of 4 mm., leaving a tan-colored solid residue of biphenyl sulfides (172 parts). Hydrogenation of an aliquot of this product as in the foregoing examples indicated that a substantial proportion of the product was present as di- and polysulfides which, on hydrogenation, were converted to the corresponding phenyl thiophenols.

Example VI

One hundred seventy-eight parts of anthracene was suspended in 500 parts of ethylene dichloride. The mixture was heated under reflux with 5 parts of zinc chloride while 68 parts of sulfur monochloride was added during 2 hours. After the evolution of hydrogen chloride had ceased, the solvent was removed by distillation, yielding 170 parts of a resinous product consisting chiefly of anthracene sulfides. Hydrogenation of an aliquot yielded a product containing anthracene thiol, indicating that anthracene di- or polysulfides were present in the original sulfide mixture.

*Example VII*

Polysulfur chloride obtained by saturating 68 parts of sulfur monochloride with sulfur, was added in portions to a solution of 128 parts of naphthalene in 400 parts of benzene containing in suspension 10 parts of anhydrous zinc chloride. The mixture was stirred at room temperature for three days until evolution of hydrogen chloride ceased. Removal of the benzene by distillation left a residue consisting of naphthyl sulfides. Hydrogenation of an aliquot indicated that naphthyl, di- and polysulfides corresponding to 51 parts of thionaphthol were formed.

While the examples illustrate the reaction of aromatic hydrocarbons with sulfur halides at temperatures of approximately 25°, 80°, and 100° C., the reaction may be carried out equally well at other temperatures. Ordinarily, reaction proceeds faster above 50 C. and it is therefore preferable to work at these temperatures. The reaction is generally carried out at temperatures below 140° C. when sulfur monochloride is used, since this compound boils at about this temperature. It is preferred to operate at 100° C. or at the refluxing temperature of the reaction mixture if this is below 100° C. Similarly, it is preferred to carry out the reaction at atmospheric pressure since this is more convenient. However, higher or lower pressures can be used with good results.

The reaction can be carried out in the absence of solvents or in the presence of an excess of one or another of the reagents which then acts as a solvent medium. Certain inert solvents may be employed as, for example, halogenated hydrocarbons, aliphatic hydrocarbons, and the like. Examples of suitable solvents are ligroin, gasoline, chloroform, carbon bisulfide, carbon tetrachloride, ethylene dichloride, tetrachloroethane, and nitrobenzene.

The sulfurization catalysts for use in the practice of this invention are metal chlorides boiling below 800° C. at atmospheric pressure. By way of illustration, some of the compounds of this class are aluminum chloride, bismuth chlorides, iron chlorides, mercuric chlorides, tin chlorides, antimony chlorides, tantalum pentachloride, titanium tetrachloride, and zinc chloride. The metal halides need not be anhydrous, since the amount of water thereby introduced into the reaction has little effect other than hydrolyzing a negligible amount of sulfur chloride. It is not essential in all cases to add the metal halide catalyst as such, since in many cases this can be formed in situ. Compounds of these metals, other than the chloride may be used which under the conditions of the reaction are at least partially converted to the chloride. As examples of some of these may be mentioned ferrous sulfate, ammonium molybdate, molybdenum trioxide, metallic zinc and the like. In addition to catalysts of the above class, it has been found that certain other materials are effective as sulfurization catalysts for bringing about the reaction of aromatic hydrocarbons with sulfur halides. For example, sulfuric acid, phosphoric anhydride, iodine, metal iodides and silver nitrate are very effective catalysts.

The proportion of sulfurization catalyst used may be varied somewhat as long as the amount does not exceed 10% by weight of the reactants. It is preferred to use 3 to 5% of catalyst based on the weight of sulfur halide and as little as 1% is effective in many instances. The use of a large proportion of catalyst is less economical and results in poorer yields of di- and polysulfides.

The time required for completing the reaction will vary depending upon the particular reactants and catalyst used. In general, the reaction is continued until no more hydrogen halide is evolved.

While the foregoing examples show the use of certain ratios of reactants, other ratios of reactants may be used without departing from the scope of this invention. The proportions of hydrocarbon and sulfur halide employed will be determined to a great extent by the type of sulfides desired. For example, if it is desired to obtain chiefly monomeric aryl sulfides, then a large excess of hydrocarbon is preferably employed, so as to increase the chances of only one molecule of sulfur halide reacting with two hydrocarbon molecules. On the other hand, if aryl sulfides in which the aromatic nuclei are substituted twice or more with sulfur atoms and products of higher molecular weight are desired, then the ratio of sulfur halide to aromatic hydrocarbon should be increased and the hydrocarbon can be added to an excess of the sulfur halide.

The process of this invention may be operated batchwise, as has been illustrated, or continuously. In the latter case the hydrocarbon is mixed with the sulfur halide with or without the use of an inert solvent and the molten or liquid mixture is led through a bed of one of the solid sulfurization catalysts which is maintained at the desired reaction temperature. The process of this invention is broadly applicable to aromatic hydrocarbons such as monoalkyl benzenes like ethylbenzene, propylbenzene, isopropylbenzene, butylbenzene, isobutylbenzene, tertiary butylbenzene, n-amylbenzene, isoamylbenzene, and the like; di- and polyalkylbenzenes such as mesitylene, diethylbenzene, methylethylbenzene, ethylbutylbenzene, tetrahydronaphthalene, and similar compounds; hydrocarbons containing more than one aromatic nucleus as, for example, diphenyl, diphenylmethane, triphenylmethane, tetraphenylmethane, 1,1-diphenylethane, 1,2-diphenylethane, phenylnaphthalene; polynuclear aromatic hydrocarbons as, for example, naphthalene, methylnaphthalenes, anthracene, phenanthrene, fluorene, indene, acenaphthene, naphthacene, picene, pyrene, triphenylene, and others. Aromatic hydrocarbons containing unsaturation in an aliphatic side chain may likewise be converted to aryl sulfides according to this invention. In addition to the simple hydrocarbons, mixtures of aromatic hydrocarbons may also be employed to obtain mixed aryl sulfides.

While the examples illustrate the use of sulfur monochloride and polysulfur chloride, other sulfur halides in which the atomic ratio of halogen to sulfur is less than 2 may be used equally well. In addition, mixtures of sulfur halides may be used. The choice of the particular sulfur halide to be used will depend to some extent upon the type of aryl sulfide to be obtained; e. g., sulfur monochloride and polysulfur chloride lead to products containing higher proportions of poly- and disulfides, whereas sulfur dichloride yields products containing a higher proportion of aryl monosulfides. The preferred sulfur halide is sulfur monochloride because of its low cost and because it leads to high yields of di- and polysulfides.

It is known that sulfur halides act as halogenating agents for aromatic hydrocarbons. It has been found that small amounts of certain catalysts, set forth in the foregoing, catalyze an entirely different type of reaction between aromatic hydrocarbons and sulfur halides; namely, one in which substantially all of the halogen is eliminated as the hydrogen halide, leaving aryl sulfides as the non-volatile reaction product. The exact mechanism by which these catalyst function is not known but it appears that they act specifically in promoting this latter type of reaction in which the hydrogen halide is evolved practically quantitatively without at the same time catalyzing the chlorination reaction so that by their use aryl sulfides are obtained. The formation of sulfides other than the simple monomeric diaryl sulfides occurs by reaction of more than one molecule of sulfur halide with each hydrocarbon nucleus. The formation of substantial amounts of di- and polysulfides is due to the use of small amounts of condensation catalyst. Large amounts of very active catalysts apparently convert di- and polysulfides to monosulfides.

The aryl sulfides prepared according to this invention have many important uses. For example, they are useful ingredients for such materials as insecticides, lubricating oil compositions, cutting oil compositions, and the like. Furthermore, the high molecular weight aryl sulfide products are useful resins. These sulfides, particularly the di- and polysulfides, are important intermediates for the preparation of other aromatic compounds. For example, as has been shown they may be reduced to aryl thiols. In addition, mild oxidation converts these materials to aryl sulfinic acids and more vigorous oxidation yields aromatic sulfonic acids. The aryl sulfides can be converted by oxidation also to aryl sulfoxides and sulfones.

The processes of this invention are advantageous over other processes for obtaining aryl sulfides in that the sulfides are obtained directly from the aromatic hydrocarbon by a single and inexpensive operation. Heretofore, aryl di- sulfides and polysulfides were obtained by the oxidation or sulfurization of thiols which have been obtainable only by a complicated series of reactions.

It is apparent that many widely different embodiments of this invention may be made without departing from the spirit and scope thereof and therefore it is not intended to be limited except as indicated in the appended claims.

I claim:

1. The process for the production of an aryl polysulfide which comprises reacting an aromatic hydrocarbon with a sulfur halide in which the atomic ratio of halogen to sulfur is less than 2, in the presence of a metal halide boiling below 800° C., present in an amount approximately from 1 to 5% by weight of the sulfur halide, at a temperature between 25° and 140° C.

2. The process for the production of an aryl polysulfide which comprises reacting naphthalene with sulfur monochloride in the presence of a metal chloride boiling below 800° C., present in an amount approximately from 1 to 5% by weight of the sulfur monochloride, at a temperature between 50° C. and 140° C.

3. The process for the production of an aryl polysulfide which comprises reacting xylene with a sulfur chloride in which the atomic ratio of chlorine to sulfur is less than 2, in the presence of a metal chloride boiling below 800° C., present in an amount of approximately 1 to 5% by weight of the sulfur chloride, at a temperature between 50° C. and 140° C.

4. The process for the production of naphthyl polysulfides which comprises reacting naphthalene with sulfur monochloride in the presence of zinc chloride at a temperature between 50° C. and 140° C., the said zinc chloride to be present in an amount of from about 1% to about 5% by weight of the sulfur monochloride.

5. The process in accordance with claim 12 characterized in that the sulfur halide is sulfur chloride.

6. The process in accordance with claim 1 characterized in that the reactants are heated to a temperature of at least 50° C.

7. The process of claim 1 in which the aromatic hydrocarbon is a mononuclear aromatic hydrocarbon.

8. The process of claim 1 in which the aromatic hydrocarbon is a dinuclear condensed ring aromatic hydrocarbon.

9. The process in accordance with claim 1 characterized in that the sulfur halide is sulfur monochloride.

10. The process of claim 1 in which the aromatic hydrocarbon is xylene.

11. The process of claim 1 in which the aromatic hydrocarbon is naphthalene.

12. The process for preparing polynuclear aryl polysulfides which comprises bringing a polynuclear condensed ring aromatic hydrocarbon and a sulfur halide in which the atomic ratio of halogen to sulfur is less than 2 into contact with a metal chloride boiling below 800° C., present in an amount approximately from 1 to 5% by weight of the sulfur halide, at a temperature between 50° C. and 140° C.

13. The process of claim 12 characterized in that polynuclear condensed ring aromatic hydrocarbon is naphthalene.

FRANK KERR SIGNAIGO.